Sept. 25, 1956   A. S. KNAPP   2,764,080
COMBINATION STOVE AND BROILER
Filed Oct. 27, 1953   2 Sheets-Sheet 1
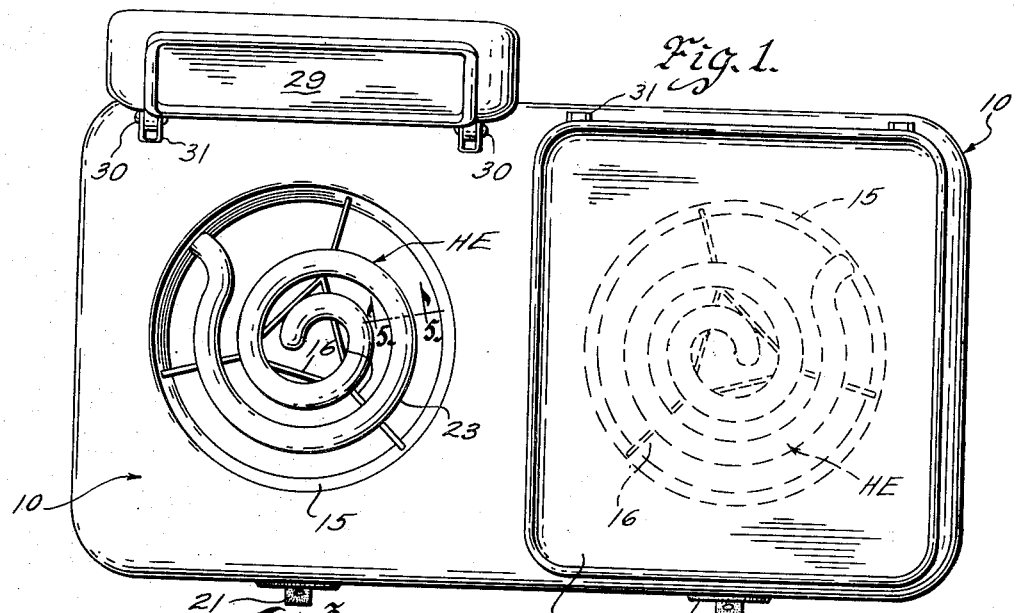
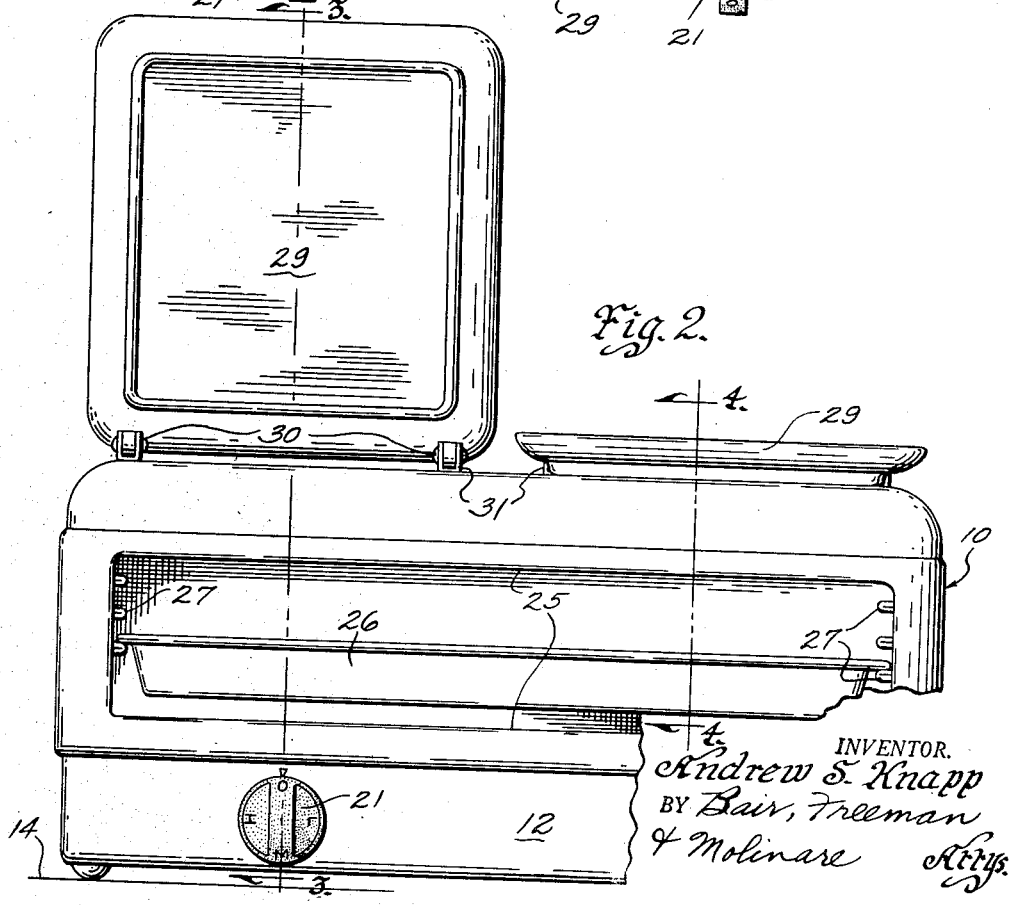
INVENTOR.
Andrew S. Knapp
BY Bair, Freeman
& Molinare
Attys.

Sept. 25, 1956
A. S. KNAPP
2,764,080
COMBINATION STOVE AND BROILER
Filed Oct. 27, 1953
2 Sheets-Sheet 2
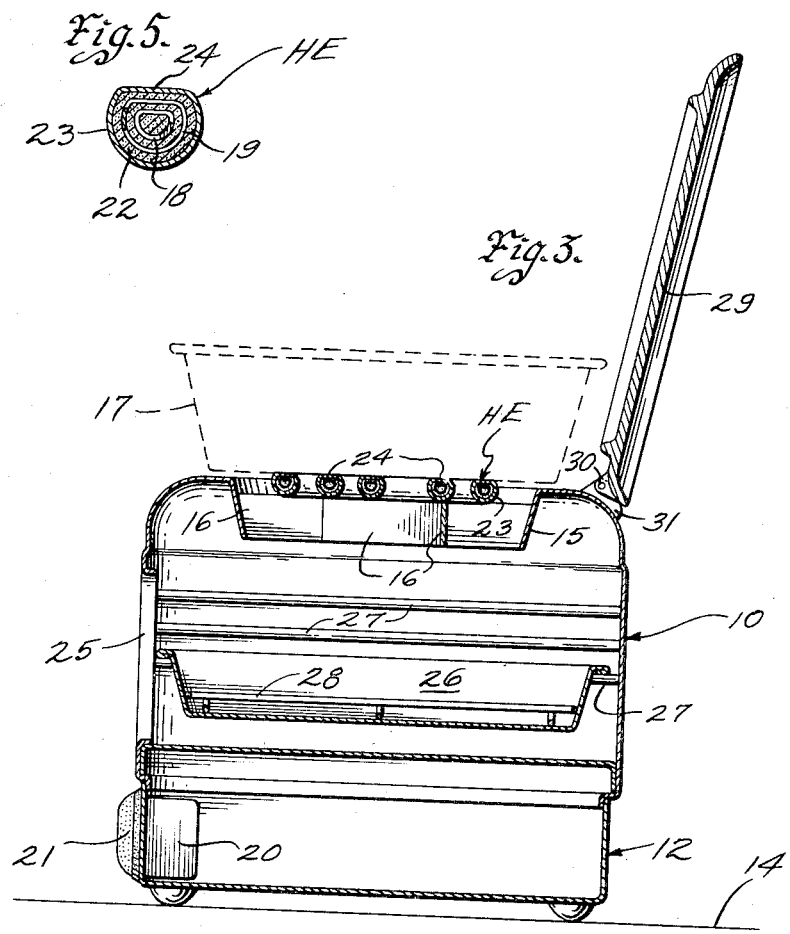
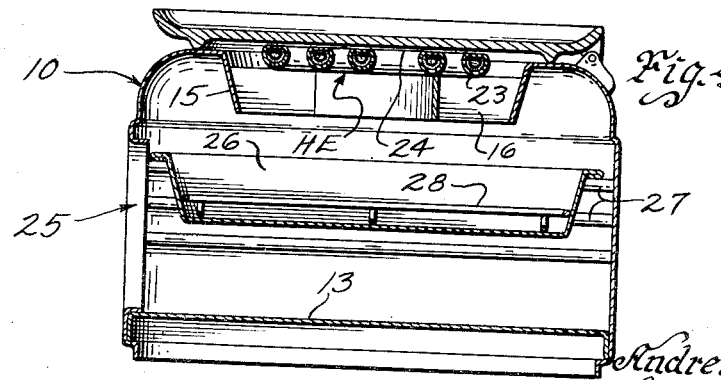
INVENTOR.
Andrew S. Knapp
BY Bair, Freeman
& Molinare Attys.

United States Patent Office 2,764,080
Patented Sept. 25, 1956

2,764,080
COMBINATION STOVE AND BROILER

Andrew S. Knapp, St. Louis, Mo., assignor to Knapp-Monarch Company, St. Louis, Mo., a corporation of Delaware Application October 27, 1953, Serial No. 388,652

2 Claims. (Cl. 99—339)

This application is a continuation in part of Andrew S. Knapp patent application, Serial No. 241,457, filed August 11, 1951 and entitled, Combination Stove and Broiler and assigned to the same assignee as the present invention, and now abandoned.

This invention relates to a combination semi-portable stove and broiler wherein the user may, at his election, fry, bake, or cook, or perform a combination of these operations, and in which a simple, inexpensive, and effective construction is provided.

In the structure disclosed herein, a table-top, semi-portable unit is formed by a frame defining a flat cooking surface surrounded by a marginal depending skirt. The latter has an opening at one side and receives a floor to form an oven. The cooking surface has an aperture which receives one or more electric heating elements disposed in substantially coplanar relation thereto but extending above the cooking surface. Covers are hingedly secured to the cooking surface and in the down position cover the apertures respectively. Each cover has a depending skirt which seals the aperture against air flow while the cover is down and has an upstanding wall cooperating with its flat top face to form a cooking or frying pan when in the down position.

In the up position, the covers permit cooking utensils to be placed on the heaters for conductive heating.

A heat reflecting depending skirt extends downwardly about the margin of each aperture in the cooking surface. This skirt concentrates the radiant heat flowing downwardly onto food placed in the oven compartment below the heater. When the cover is down, or a utensil is placed on the heater, the cover, or the bottom of the utensil, as the case may be, directs radiant heat downwardly into the oven space.

The under surface of each cover is made of material highly reflective to heat. It is in spaced relation to the heater even when the cover is down so that the upwardly directed radiant energy from the heater is reflected down into the oven space.

In the structure described herein the parts coact to provide effective cooking, such as broiling, in the oven compartment despite the limited energy capacity of the heaters. This is due in part to the effectiveness of the cover which seals the aperture and forms a reflective backing for the heater and in part to the depending reflected skirt surrounding the aperture. Yet, when it is desired to heat cooking utensils without heating the oven, this can be done without loss of heat energy as utensils carried by the heater are above the cooking surface and permit a chimney effect which convectively heats the utensils while cooling the oven space.

It is, therefore, a general object of the present invention to provide an improved semi-portable stove and broiler which can be used as an oven, as a heater for cooking utensils, and as a frying pan, or for several of these purposes at once at the election of the user and is simple, inexpensive, and reliable in construction.

A more specific object of the present invention is to provide an improved combined stove and broiler of the foregoing type which includes swingable cover elements which in the up position enable direct conductive heating of a cooking utensil and in the down position serve to direct radiant heat into the stove compartment, shut off conductive air movement or chimney effect through the heater, and form a pan upon which foods may be fried.

Still another object of the present invention is to provide an improved combined stove and broiler in which the limited heating capacity of an electrical heater is concentrated and directed in such fashion as to heat the oven space adequately while at the same time enabling the user to cook in cooking utensils as desired.

The novel features which I believe to be characteristic of my invention are set forth with particularity in the appended claims. My invention, itself, both as to its organization and method of operation together with further objects and advantages thereof may best be understood by reference to the following description taken in connection with the accompanying drawings, in which:

Figure 1 is a top plan view of a combination stove and broiler showing the cover element for the left heating element open and the cover element for the right-hand element closed;

Figure 2 is a front elevation of Figure 1, a portion of the appliance being broken away to conserve space on the drawing;

Figure 3 is a cross sectional view through axis 3—3, Figure 1, showing a pan in place for heating;

Figure 4 is a cross sectional view through axis 4—4, Figure 1, showing a cover in composition;

Figure 5 is an enlarged fragmentary cross sectional view through the heating element as taken at the axis 5—5, Figure 1.

In the accompanying drawing, the reference numeral 10 indicates in general the housing or frame of the combined stove and broiler. The base 12 of the housing has depending feet which rest upon a suitable support surface 14, Figure 3, which may, for example, be a tabletop. Partition 13, Figure 4, extends across the housing or frame and is sustained therein by an outwardly extending shoulder in the skirt part of the housing as shown. This partition is imperforate and serves to prevent heat flow and droppage of food particles from the heaters or the oven onto the support surface 14.

The top face or cooking surface of the housing 10 has a pair of circular apertures 15, each of which receives a heating element HE which is generally coplanar or substantially flush with the top of the housing 10. Each of the openings 15 is defined by an annular conical skirt or flange as shown in Figure 3. The vertical extent of each skirt or flange is small in relation to the size of the aperture, as shown, to provide effective direction of radiant heat without interfering with the oven. Each skirt forms a chimney having its bottom opening within the confines of housing 10 and its top opening flush with the top face of the housing 10. A sheet metal spider 16 bridges each skirt. This spider has a triangular conformation at its central portions and radially extending arms extending outwardly from the apexes of the triangle, as shown in Figure 1. The strips 16 are vertically oriented to minimize interference with air flow and radiation between the oven and heating element and to provide maximum strength in relation to their size. They support the heating element as shown in Figure 3. The spiders may be formed and anchored to the skirts or flanged of the openings 15 by any suitable means, such as spot welding, riveting, etc.

Each heating element HE is provided with a pair of resistance coils 18 and 19 which may be controlled as to electrical energization by suitable electric switches 20 provided with control knobs 21. The usual switching arrangement energizing one of the heating elements for low heat, another for medium heat and both for high heat may be provided.

The resistance coils 18 and 19 are imbedded in insulating material 22 which may be argillaceous material in plastic form extruded with the resistance coils. The heating element may then be fired to reduce the plastic insulating material to a ceramic, and flattened on its upper surface as indicated at 24 to increase surface contact with the cooking utensil 17. As best seen in Figure 3, the flattened upper surface 24 of the heating element HE is disposed slightly above the top wall or cooking surface of the housing 10, so as to be adapted to freely support the cooking utensil 17 thereon.

The housing 10 is provided with an open front through which a broiler pan 26, Figures 3 and 4, may be introduced. The pan is preferably supported on rails 27, a plurality of which may be provided vertically spaced from each other for permitting the broiler pan 26 to be adjusted toward or from the heating element HE as desired. These rails may be defined by vertical folded sheet metal liners provided in the housing 10. Within the pan 26 the usual broiler rack 28 may be provided for supporting the commodity to be broiled.

The cover elements are shown generally at 29. These are hinged at 30 so that the elements may be raised to the vertical position of Figure 3 or lowered to the covering or horizontal position of Figure 4. The hinges are supported by brackets 31 attached to housing 10 as shown in Figures 2 and 3. When the covers are in the up position as shown in Figure 3, the heating element HE is exposed and a pan 17 or other cooking utensil may be placed thereon for conductive and convective heating. When in the down position of Figure 4, the covers seal the openings 15 to prevent air flow since they have marginal skirt portions which rest on the top face of the housing to form a seal. The under surface of the cover 29 is made of heat reflecting material to provide a maximum radiant heat flow, the radiant energy from the hot heating element being reflected downwardly into the oven chamber. Also, when the cover is in the position of Figure 4, the marginal rim on the top surface permits the user to fry eggs and other foods.

From the above description, it will be apparent that I have provided an improved stove and broiler combination which is capable of functioning for either purpose or for both purposes simultaneously. When simultaneously cooking and broiling, of course, the cooking pan such as 17, Figure 3, serves to contain foods to be cooked. Also, it is possible to cook foods in the broiler pan 26 either with the covers 29 up and the pan 17 in position or, at a somewhat greater heating rate, with the covers 29 in down position.

While I have shown and described a specific embodiment of the present invention, it will of course be understood that I do not wish to be limited thereto and that many modifications, and alternative constructions may be made without departing from the true spirit and scope thereof. I, therefore, intend by the appended claims to cover all such modifications and alternative constructions as fall within their true spirit and scope.

What I claim as new and desire to secure by Letters Patent of the United States is:

1. A combination stove and broiler comprising: a frame defining a flat cooking surface surrounded by a marginal depending skirt and having a floor attached to the skirt to form an oven chamber below the cooking surface, the cooking surface having an aperture; a substantially flat electric heating element disposed in the aperture of the cooking surface, the upper surface of said heating element being disposed slightly above said cooking surface to freely support cooking utensils thereon; a depending skirt extending downwardly from the cooking surface at the margin of said aperture to define a duct having a relatively small height in relation to the size of the aperture; said skirt being downwardly tapered and having its inner face formed of heat reflecting material for concentrating a downwardly directed flow of radiant heat, a pan adapted to fit into the oven chamber, the pan and the first mentioned skirt having interengaging conformations adapted to support the pan at selected distances in aligned relation below said heating element to receive the downwardly directed heat therefrom; and a cover having a heat reflecting under surface swingably supported in relation to the cooking surface to register with the aperture when in down position, said cover when in the down position defining a reflecting surface vertically spaced above the heater element and having a depending skirt seating against the cooking surface to form a seal to prevent air flow through the aperture.

2. A combination stove and broiler comprising: a frame defining a flat cooking surface surrounded by a marginal depending skirt and having a floor attached to the skirt to form an oven chamber below the cooking surface, the cooking surface having an aperture; a substantially flat electric heating element disposed in the aperture of the cooking surface, the upper surface of said heating element being disposed slightly above said cooking surface to freely support cooking utensils thereon; a depending skirt extending downwardly from the cooking surface at the margin of said aperture to define a duct having a relatively small height in relation to the size of the aperture; said skirt being downwardly tapered and having its inner face formed of heat reflecting material for concentrating a downwardly directed flow of radiant heat, a pan adapted to fit into the oven chamber, the pan and the first mentioned skirt having interengaging conformations adapted to support the pan at selected distances in aligned relation below said heating element to receive the downwardly directed heat therefrom; and a cover having a heat reflecting under surface swingably supported in relation to the cooking surface to register with the aperture when in down position, said cover when in the down position defining a reflecting surface vertically spaced above the heater element and having a depending skirt seating against the cooking surface to form a seal to prevent air flow through the aperture, said cover further having an upstanding marginal wall to form a cooking pan when in the down position, and the first mentioned depending skirt having a bore opening at one side for access to said oven chamber for receipt and removal of said pan therethrough.

References Cited in the file of this patent

UNITED STATES PATENTS

| | | |
|---|---|---|
| 1,263,359 | Armstrong | Apr. 23, 1918 |
| 1,729,662 | Guest | Oct. 1, 1929 |
| 1,786,345 | Itzi | Dec. 23, 1930 |
| 1,903,477 | Rolfson | Apr. 11, 1933 |
| 1,959,198 | Conry | May 15, 1934 |
| 2,198,647 | Wolcott | Apr. 30, 1940 |
| 2,422,950 | Cash | June 24, 1947 |
| 2,550,843 | McOrlly | May 1, 1951 |

FOREIGN PATENTS

| | | |
|---|---|---|
| 648,707 | Germany | Aug. 7, 1937 |